US006411197B1

(12) United States Patent
Morita

(10) Patent No.: US 6,411,197 B1
(45) Date of Patent: *Jun. 25, 2002

(54) APPARATUS AND METHOD FOR RECEIVING AN INTERLEAVED SELECTIVE CALLING SIGNAL

(75) Inventor: Kazuo Morita, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 09/333,052

(22) Filed: Jun. 15, 1999

(30) Foreign Application Priority Data

Jun. 15, 1998 (JP) .......................................... 10-167281

(51) Int. Cl.[7] ............................ G08B 5/22; H04B 1/16; H04B 1/38; H04B 7/00
(52) U.S. Cl. ..................... 340/7.35; 340/7.33; 340/732; 455/574; 455/343; 370/313
(58) Field of Search ............................... 455/38.2, 38.1, 455/343, 574; 370/349, 311, 337, 475, 313; 340/825.44, 825.27, 7.2, 7.32, 7.33, 7.35, 7.43

(56) References Cited

U.S. PATENT DOCUMENTS 5,493,282 A * 2/1996 Petreye et al. ......... 340/825.27

FOREIGN PATENT DOCUMENTS

| JP | 60-182232 | 9/1985 |
| JP | 62-266932 | 11/1987 |
| JP | 4-115632 | 4/1992 |
| JP | 4-200029 | 7/1992 |
| JP | 9-37317 | 2/1997 |
| JP | 9-46744 | 2/1997 |
| JP | 10-117250 | 5/1998 |

OTHER PUBLICATIONS

Japanese Office Action dated Mar. 16, 1999, with partial translation.
Japanese Office Action dated Jun. 8, 1999, with partial translation.

* cited by examiner

Primary Examiner—Nay Maung
Assistant Examiner—Raymond B. Persino
(74) Attorney, Agent, or Firm—McGinn & Gibb, PLLC

(57) ABSTRACT

A radio selective call receiver for receiving an interleaved selective calling signal with reduced power consumption is disclosed. The Interleaved address data is converted to address data for each of the addresses. A timing detector detects predetermined decision timing based on the interleaved address data. The predetermined decision timing is set at a desired position within a block of the interleaved address data. An interim comparator is provided to compare partial address data for each of the addresses with a counterpart of its own address at the predetermined decision timing. The radio system is selectively powered on and off at the predetermined decision timing based on comparison results for the received addresses.

19 Claims, 4 Drawing Sheets

INTERLEAVED DATA

POWER ON/OFF CONTROL

001
APPARATUS AND METHOD FOR RECEIVING AN INTERLEAVED SELECTIVE CALLING SIGNAL

BACKGROUND OF THE INVENTION

1. Field of the Invention

The present invention relates to a radio selective call receiver which is designed to receive an interleaved radio selective calling signal, and a receiving method thereof.

2. Description of the Related Art

In general, a battery-powered radio selective call receiver operates according to a battery saving scheme. More specifically, it Is determined whether a received selective calling signal is addressed to the receiver itself by conducting bit comparison between the received address information and the stored address information of its own. If the received selective calling signal is not addressed to its own station, the power supply to a radio receiving system is suspended. On the other hand, when the received selective calling signal is addressed to the receiver itself, then the power supply to the radio receiving system is continued and desired receiving operation is conducted.

There has been proposed a selective call receiver in Japanese Patent Application Laid-Open No. 60-182232. which shorten an unnecessary operation time to prolong the life of a battery. More specifically, the received address information is compared bit by bit to the stored address information of its own. At the time when the number of error bits exceeds a predetermined value, the radio receiving system is powered off to stop the receiving operation, resulting in reduced power consumption.

On the other hand, in the recent years. such a scheme that a plurality of data streams are interleaved in bits has been adopted. In the interleaving scheme, one block is formed of a plurality of words, and the bits of each word are interspersed in one block in a predetermined fashion. For example, four stings of 32-bit data: A1–A32, B–B32, C1–C32, and D1–D32 are interleaved to produce a sequence of A1, B1, C1, D1, A2, B2, C2, D2, A3, B3, C3, D3, ..., A32, B32, C32, and D32. Such an interleaving scheme has features of high noise immunity and easy error correction.

In the interleaving scheme, since the bits of each word are interspersed in one block, all bits of address information are not complete unless all data of one block have been received. In a radio selective call receiver in a system adopting the interleaving scheme, therefore, at the time when all data of one block has been received, it is determined whether the radio selective calling signal is addressed to the receiver itself.

Therefore, it is necessary to receive all data of one block even when it is apparent that the received selective calling signal is not addressed to the receiver itself, resulting in useless operation and wasteful power consumption. From the viewpoint of prolonging the battery life, it is in need of improvement.

SUMMARY OF THE INVENTION

An object of the present invention is to provide an apparatus and method for receiving an interleaved selective calling signal, which can achieve reduced power consumption.

According to the present invention, in an apparatus for receiving an interleaved selective calling signal including a block of interleaved address data of a plurality of addresses each having a predetermined bit length, an address storage stores a predetermined address which has been assigned to the apparatus and a radio system receives the interleaved selective calling signal to produce interleaved reception data. The apparatus further includes a converter for converting the interleaved address data to address data for each of the addresses and a timing detector for detecting predetermined decision timing based on the interleaved address data, wherein the predetermined decision timing is set at a desired position within the block of the interleaved address data. An interim comparator is provided to compare partial address data for each of the addresses with a counterpart of the predetermined address stored in the address storage at the predetermined decision timing to produce a decision result for each of the addresses. A controller controls such that the radio system is selectively powered on and off at the predetermined decision timing based on decision results for the addresses.

Since an interim decision is performed at the predetermined decision timing within the block of the interleaved address data, it Is possible to determine whether the predetermined address is included in the received addresses at an earlier time before all the data of the block is received.

Further, when it is determined that the predetermined address is not included in the received addresses at the predetermined decision timing, the radio system is powered off, resulting in reduced power consumption and therefore improved battery life.

BRIEF DESCRIPTION OF THE DRAWINGS

FIG. 2 is a block diagram showing the detailed circuit configuration of a principal part of the embodiment composed of an interim address comparator, a full address comparator, and a error decision section of;

DESCRIPTION OF THE PREFERRED EMBODIMENT

Figure 1:
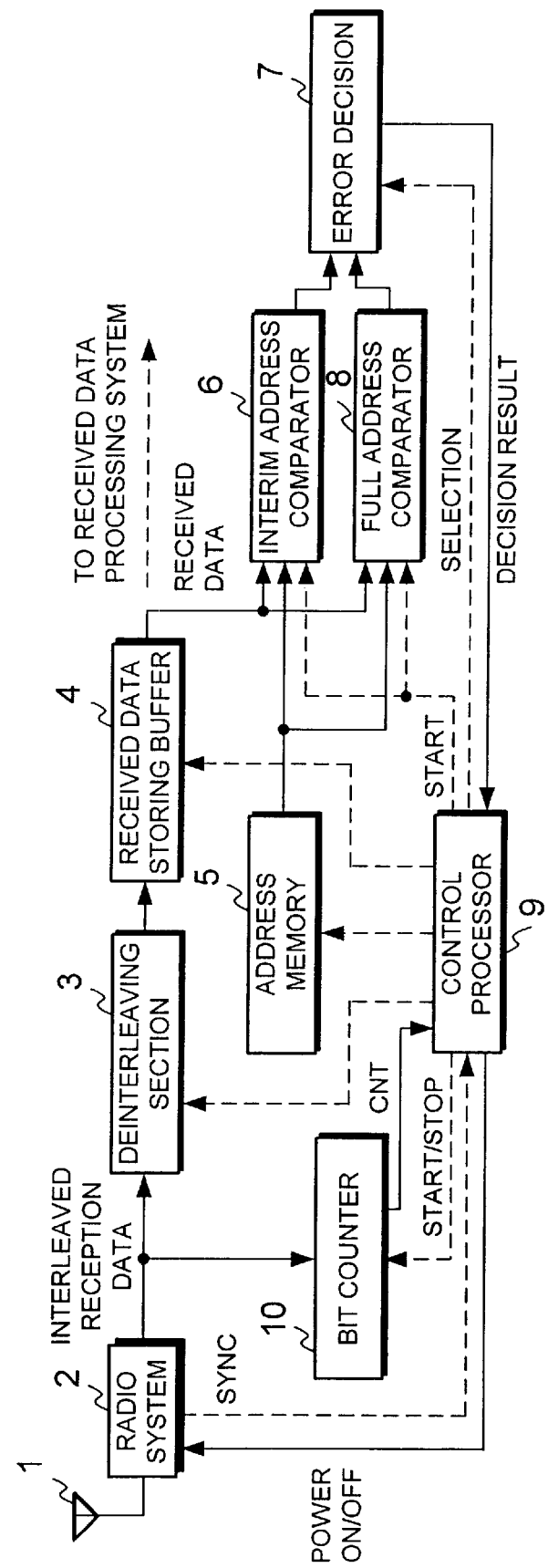
FIG. 1 is a block diagram showing the circuit configuration of a radio selective call receiver according to an embodiment of the present invention.

Referring to FIG. 1, an antenna 1 is connected to a radio system 2 which receives an interleaved selective calling signal composed of each synchronization signal followed by a plurality of blocks and performs the received signal processing such as demodulation to produce interleaved reception data. The radio system 2 is supplied with power depending on a power on/off signal received from a control processor 9. The interleaved reception data is output to a deinterleaving section 3 and a bit counter 10. The deinterleaving section 3 places the interleaved reception data bit by bit in original alignment to produce reception data, which is stored onto a received data storing buffer 4. The reception data stored in the received data storing buffer 4 is composed of a plurality of words each having an address field followed by a data field. The bit counter 10 is reset for a predetermined value $C_{SET}$ and counts the number of bits of the interleaved reception data under control of the control processor 9.

The radio selective call receiver is further composed of an address memory 5 storing the address of its own, an interim address comparator 6, an error decision section 7, and a full address comparator 8. The interim address comparator 6 receives a part of the address for each received word data and compares it in bits to the counterpart of the address stored in the address memory 5. The interim address comparator 6 outputs an interim comparison result to the error decision section 7. The full address comparator 8 receives the received address for each received word data and compares it in bits to the address stored in the address memory 5. The full address comparator 8 outputs a full comparison result to the error decision section 7.

The error decision section 7 checks whether the number of error bits included in the interim comparison result is not smaller than a predetermined number $C_{TH}$ (here, $C_{TH}$=3). If the number of error bits is equal to or greater than the predetermined number $C_{TH}$, it is determined that the reception data has no information addressed to the receiver itself. The error decision section 7 outputs a decision result to the control processor 9 and the control processor 9 controls the radio system 2 depending on the decision result. In the case of the decision result indicating that the reception data has no information addressed to the receiver itself, the radio system 2 is powered off for battery saving. Contrarily, if the reception data includes information addressed to the receiver itself, the receiving operation is continued.

As will be described later, the control processor 9 monitors the count CNT of the bit counter 10 and determines whether the count CNT reaches the predetermined value $C_{SET}$. When the count CNT reaches the predetermined value $C_{SET}$, the control processor 9 determines based on decision results received from the error decision section 7 whether the receiving operation should be continued.

Hereafter, assuming that the preset value $C_{SET}$ of the counter 10 is 128 which corresponds to a half one block (256 bits) and address data consists of 32 bits. The preset value $C_{SET}$ of the counter 10 may be another value determined depending on desired accuracy of error decision.

Figure 2:
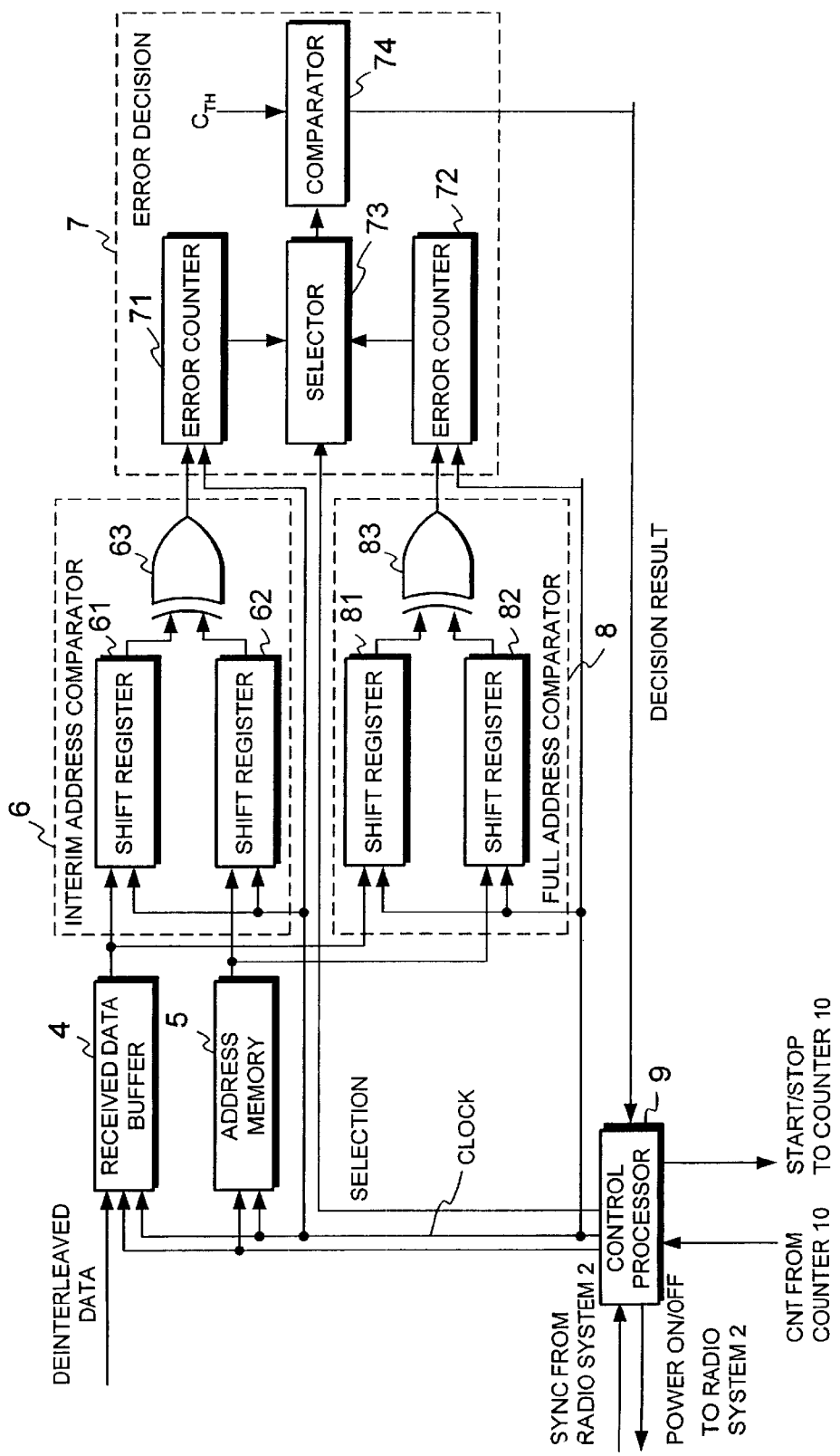

Referring to FIG. 2, the interim address comparator 6 is composed of shift registers 61 and 62, and an exclusive OR circuit 63. Similarly, the full address comparator 8 is composed of shift registers 81 and 82, and an exclusive OR circuit 83. The shift registers 61 and 62 of the interim address comparator 6 are a 16-bit shift register, and the shift registers 81 and 82 of the full address comparator 8 are a 32-bit shift register.

At the time when a first half of the received address data for each word has been stored in the received data storing buffer 4, the first half of the address data is stored onto the shift registers 62 and 82 and the first half of the received address data for each word is stored onto the shift registers 61 and 81 under control of the control processor 9. Then, the exclusive OR circuit 63 compares the received address data for each word bit by bit to the stored address data to produce an error bit. The full address comparator 8 performs the similar comparing operation for the 32-bit address data.

The error decision section 7 is composed of an error counter 71 for counting the number of error bits received from the exclusive OR circuit 63 of the interim address comparator 6 and an error counter 72 for counting the number of error bits received from the exclusive OR circuit 83 of the full address comparator 8. A selector 73 selects one of the outputs of the error counters 71 and 72 depending on a selection control signal received from the control processor 9. In this embodiment, the selector 73 selects the error counter 71 unless it is determined that at least one address candidate exists in the reception address data words. The comparator 74 compares the selected output (the number of error bits for each word) to the predetermined value $C_{TH}$. The comparison result for each word is output as a decision result to the control processor 9.

Hereinafter, an operation of the radio selective call receiver as shown in FIG. 1 will be described with reference to FIG. 3A and FIG. 3B.

Figure 3A:
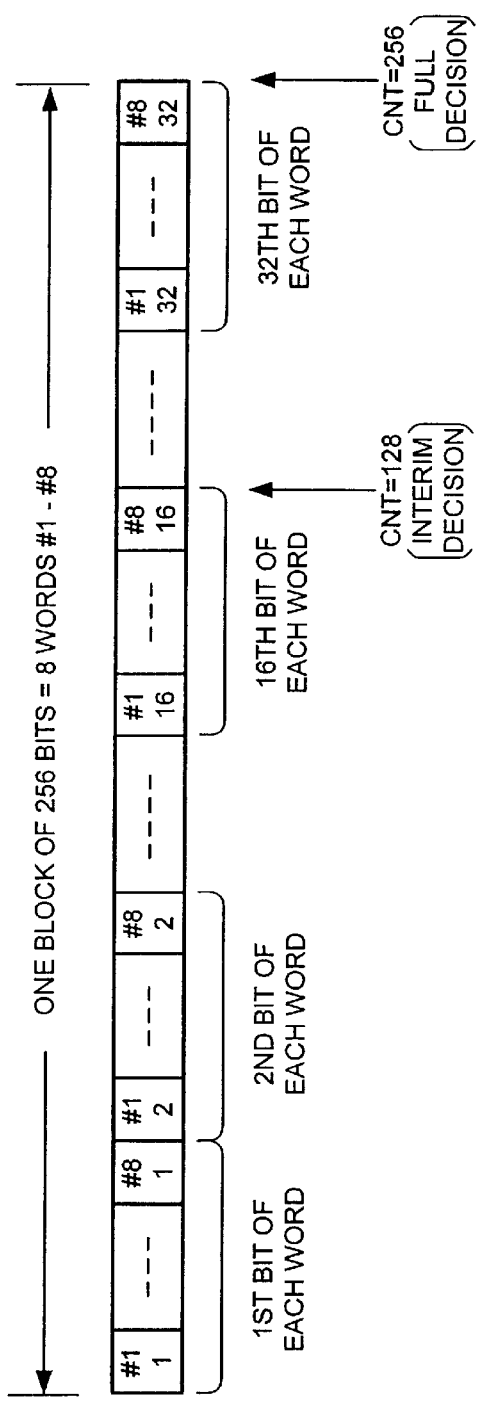
FIG. 3A is a schematic diagram illustrating a block format of interleaved received data.

As shown in FIG. 3A, it is assumed for simplicity that a block of the interleaved reception data is formed by 8 words #1 through #8 each word having 32 bits. Therefore, each block has 256 bits. In a block, first bits of respective 32-bit words are disposed at the first 8 bits of the block, respectively. Similarly, the second bits, . . . 16th bits, . . . 32nd bits of respective 32-bit words are disposed in the present order. In this way, the bits of each word are interspersed to produce interleaved data to be transmitted.

Figure 3B:
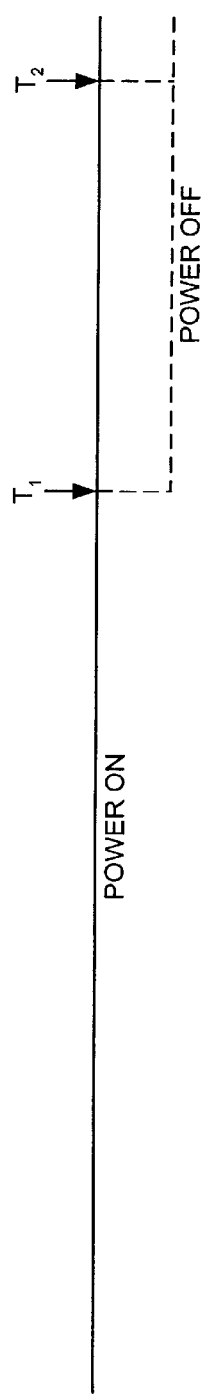
FIG. 3B is a diagram illustrating a battery saving operation according to the embodiment.

As shown in FIG. 3B, a radio selective calling signal conveying such interleaved data in blocks is received and demodulated by the radio system 2 powered on by the control processor 9 and the interleaved reception data is output to the deinterleaving section 3 and the bit counter 10. The deinterleaving section 3 deinterleaves the interleaved reception data to output it to the received data storing buffer 4. The received data storing buffer 4 has a memory area for storing eight 32-bit words #1–#8. The deinterleaved data of 32-bit words #1–#8 are transferred to a received data processing system, which is a conventional receiving route.

In decision as to address information of its own station in such interleaved reception data, accurate judgment cannot be made until all of eight 32-bit words have been ascertained, as described above. Therefore, it becomes necessary to receive all bits of the block. In the case where the address information of its own is not contained, however, this results in wasteful operation of one block.

In the present embodiment, therefore, interim address decision is conducted in the middle of one block and an address candidate is selected.

Referring to FIG. 3B, when the radio system 2 is powered on and detects the sync signal, the radio system 2 demodulates an interleaved selective calling signal to produce interleaved reception data. At the same time, the bit counter 10 is started counting the number of bits of the interleaved reception data under the control of the control processor 9.

When the count CNT reaches the predetermined value $C_{SET}$ (here, $C_{SET}$=128), that is, at the time instant $T_1$ (the middle of one block), the interim address decision is conducted and an address candidate is determined. More specifically, when the count CNT reaches the predetermined value $C_{SET}$=128, first-half address data (1–16) of each 32-bit address word (#1–#8) are stored in the received data storing buffer 4. The interim address comparator 6 compares the half-address data for each 32-bit address word bit by bit to the registered address data stored in the address memory 5 to produce error-bit data for each address word. Then, the error decision section 7 makes a decision on whether the number of error bits for each address word is not smaller than the predetermined value $C_{TH}$ (here, $C_{TH}$=3) and outputs the decision result for each address word to the control processor 9. In this way, the control processor 9 can determine an address candidate, that is, an address word having the number of error bits smaller than the predetermined value $C_{TH}$.

If the half-address data for all address words #1–#8 have the number of error bits equal to or greater than the predetermined value $C_{TH}$, in other words, no address candidate exists, then the control processor 9 powers off the radio system 2 to suppress wasteful power consumption at the time instant $T_1$ as shown in FIG. 3B.

Contrarily, if at least one address candidate exists, then the control processor 9 continues to supply the radio system 2 with power and thereby the receiving operation is continued. At the time ($T_2$) when all bits of one block, i.e., 256 bits have been received, full address decision is conducted through the full address comparator 8 and the error decision section 7. In this case, the selector 73 of the error decision section 7 selects the full address comparator 8 according to the selection control signal. If the number of error bits included in the received full address is smaller than the predetermined value $C_{TH}$, then it is determined that the address of its own is contained in the received data and then a subsequent block is transferred to the received data processing system.

If it is determined that the address of its own is not contained in the received data in the full address decision, then the radio system 2 is powered off, and reception of subsequent block is suspended.

The details of the receiving operation will be described hereafter.

When the synchronization signal has been detected, the control processor 9 sends a start signal to the bit counter 10, and thereby causes the bit counter 10 to count bits in order beginning from the head bit of the interleaved reception data. The control processor 9 monitors the output count CNT of the bit counter 10 to see whether the output count CNT has reached the predetermined value of 128. The 128th bit of the current received block is the 16th bits of respective words. At this timing ($T_1$), respective words up to the 16th bit have been stored in the received data storing buffer 4.

When the bit counter 10 outputs the count value CNT= 128. the control processor 9 sends word address specification to the received data storing buffer 4, supplies the clock to the received data storing buffer 4, and causes the received data storing buffer 4 to output 16-bit received data to the interim address comparator 6 in order beginning from the word #1.

The control processor 9 sends address specification of the first-half bits to the address memory 5, supplies the clock to the address memory 5, and causes the address memory 5 to output the first-half address information to the interim address comparator 6.

Further, the control processor 9 supplies the clock to the shift registers 61 and 62 of the interim address comparator 6. The 16-bit received data is taken into the shift register 61 and, in the same way, the counterpart of the registered address stored in the address memory 5 is taken into the shift register 62. As a result, the exclusive OR circuit 63 conducts bit comparison for each of 16 bits, bit by bit. In the case of coincidence, the exclusive OR circuit 63 outputs "0." In the case of noncoincidence, the exclusive OR circuit 63 outputs "1."

Furthermore, the control processor 9 supplies the clock to the error counter 71 of the error decision section 7, and causes the error counter 71 to count the number of times of outputting "1" from the exclusive OR circuit 63. At the same time, the control processor 9 sends the selection control signal to the selector 73 and thereby causes the selector 73 to select the output of the error counter 71 and output it to the comparator 74. For each of 8 words, therefore, the comparator 74 compares the magnitude of the predetermined value $C_{TH}$ (i.e., the number of permitted errors, here, $C_{TH}=3$) with the count value $C_{TH}$ of the error counter 71, and outputs a decision result (i.e., a comparison result) of each word to the control processor 9.

To be concrete, the comparator 74 usually keeps its output at, for example. a high level. When the count value $C_{ER}$ of the error counter 71 is less than the predetermined value $C_{TH}$, the comparator 74 does not change its output and keeps its output at the high level. On the other hand, when the count value of the error counter is greater than or equal to the predetermined value $C_{TH}$, the comparator 74 changes its output to a low level.

When there is a word having address information corresponding to its own address, the comparator 74 changes its output corresponding to the pertinent word. When the output level of the comparator 74 thus changes, or when the output level of the comparator 74 is kept at the high level and is not changed in all of eight words, then the control processor 9 can determine that its address information is contained in the eight words #1–#8. In this case, the control processor 9 continuously outputs the power-on signal to the radio system 2. The bit counter 10 continues its count operation.

In contrast, when the address information corresponding to its own address information is not contained, then the comparator 74 keeps its output at a low level from the beginning to the end in the comparison of the word #1 through word #8. In this case. the control processor 9 judges that no address candidate is contained in any of the words, and switches the power-on signal supplied to the radio system 2 over to a power-off signal. Furthermore, the control processor 9 stops the bit counter 10 and brings the bit counter 10 into its initial state to be ready for the next reception.

In the case where the control processor 9 can determine the presence of its own address information, the control processor 9 monitors the output value of the bit counter 10 to see whether it reaches 256. When the bit counter 10 outputs the count value of 256, the control processor 9 sends word address specification to the received data storing buffer 4, supplies the clock to the received data storing buffer 4, and causes the received data storing buffer 4 to output 32-bit received data to the full address comparator 8 in order beginning from the word #1.

Further, the control processor 9 sends address specification of full 32 bits to the address memory 5, supplies the clock to the address memory 5, and causes the address memory 5 to output the full address information of 32 bits to the full address comparator 8.

Furthermore, the control processor 9 supplies the clock to the shift registers 81 and 82 of the own address comparison circuit 8. The 32-bit received data is taken into the shift register 81, and, in the same way, the full address information of 32 bits is taken into the shift register 82. As a result, the exclusive OR circuit 83 conducts bit comparison for each of 32 bits, bit by bit. In the case of coincidence, the exclusive OR circuit 83 outputs "0." In the case of noncoincidence, the exclusive OR circuit 83 outputs "1."

The control processor 9 supplies the clock to the error counter 72 of the error decision unit 7, and causes the error counter 72 to count the number of times of outputting "1" from the exclusive OR circuit 83. At the same time, the control processor 9 sends the switchover signal to the selector 73 and thereby causes the selector 73 to select the output of the error counter 72 and output it to the comparator 74. For each of the eight words, therefore, the comparator 74 compares the magnitude of the predetermined value $C_{TH}$ with the count value $C_{ER}$ of the error counter 72, and outputs a decision result (i.e., a comparison result) of each word to the control processor 9. Concrete operation of the comparator 74 is conducted in the same way as the foregoing description.

When the output level of the comparator 74 changes, or when the output level of the comparator 74 is kept at the high level and is not changed in all words, then the control processor 9 formally judges that its own address information is contained in the eight words. The control processor 9 continuously outputs the power-on signal to the radio system 2. As a result, a block subsequent to the block containing this address information is received. The control processor 9 can distinguish which word contains its own address.

In contrast, when the comparator 74 keeps its output at a low level from the beginning to the end in the comparison of the word #1 through word #8, the control processor 9 formally judges that its own address information is not contained in any of the words, and switches the power-on signal supplied to the radio system 2 over to a power-off signal. Furthermore, the control processor 9 stops the bit counter 10 and brings the bit counter into its initial state to be ready for the next reception.

Figure 4:
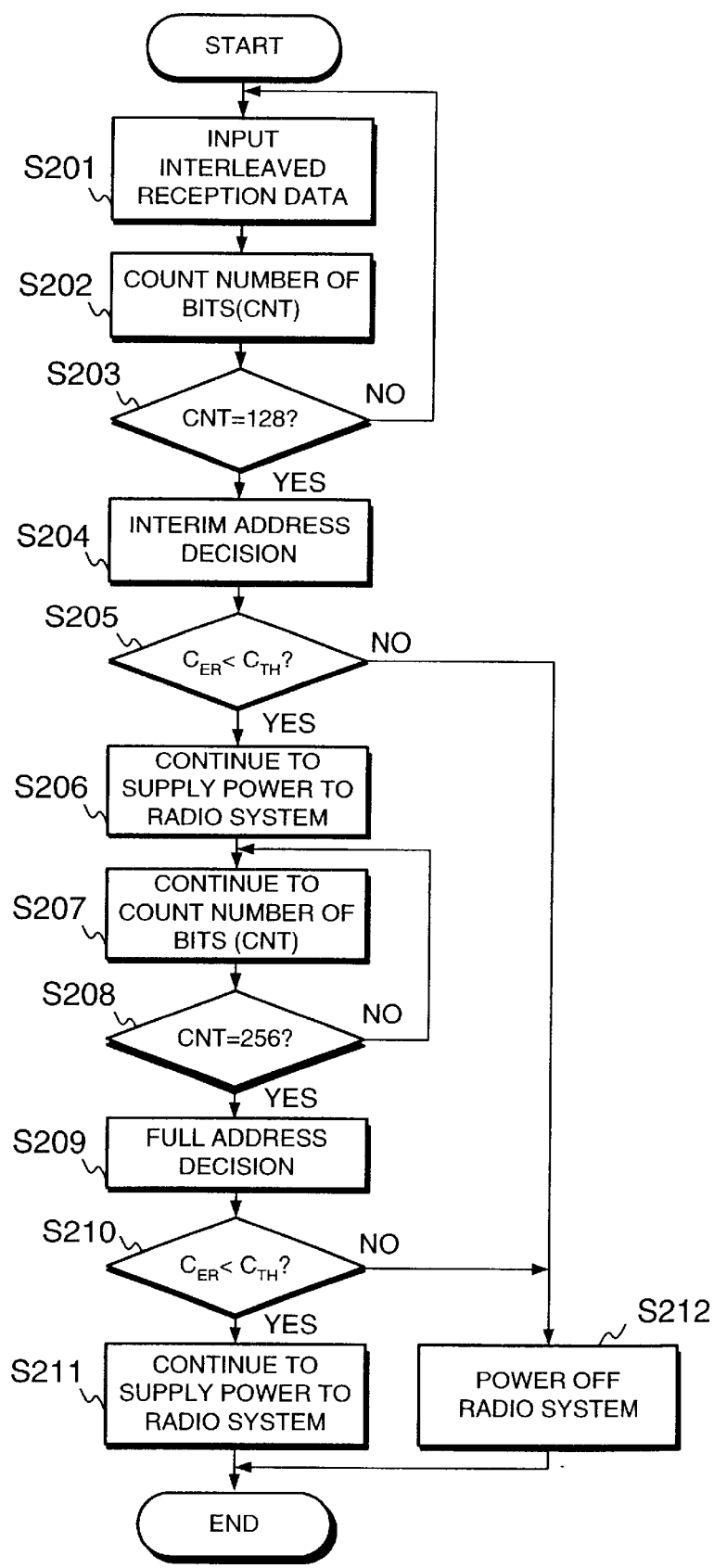
FIG. 4 is a flow chart showing an operation of the embodiment.

Referring to FIG. 4, the interleaved received data is output from the radio system 2 to the deinterleaving section 3 and the bit counter 10 (step S201). The reception data is stored in the received data storing buffer 4 and, in parallel therewith, the bit counter 10 counts bits of the interleaved received data until the count CNT reaches 128 (steps S202 and S203).

When the count CNT reaches 128 (YES in step S203), the interim decision based on bit comparison between the deinterleaved received data (16 bits per word) and the counterpart of its own address (16 bits) is conducted (step S204). In this decision, it is checked whether the number of error bits ($C_{ER}$) is less than the predetermined value $C_{TH}$=3 (step S205).

If $C_{ER} \geq C_{TH}$ (NO in step S205), then a candidate of its own address is judged to be absent, power supply to the radio system 2 is suspended (step S212), and the bit counter 10 is initialized to be ready for the next reception. As a result, occurrence of wasteful electric power consumption is avoided.

On the other hand, if $C_{ER} < C_{TH}$ (YES In step S205), then a candidate of its own address is judged to be present, power supply to the radio system 2 is continued (step S206), and the bit counter 10 continues its count operation (step S207).

When the count CNT indicates the 256th bit, i.e., full bits of the block (YES in step S208), then a full address decision based upon the bit comparison between the deinterleaved received data (32 bits per word) and all bits of its own address (32 bits) is conducted (S209). In this decision, it is checked whether the number of error bits ($C_{ER}$) is less than the predetermined value $C_{TH}$=3 (step S210).

If $C_{ER} < C_{TH}$ (YES in step S210), then the presence of its own address is judged to be confirmed, and power supply to the radio system 2 is continued (step S211). Subsequent blocks are received, and delivered to the receiving processing system. In addition, the bit counter 10 is initialized to be ready for the next reception.

On the other hand. If $C_{ER} \geq C_{TH}$ (NO in step S210), then its own address is judged to be absent, power supply to the radio system 2 is suspended (step S212), and the bit counter 10 is initialized to be ready for the next reception.

The present embodiment has been described assuming that each block is composed of eight words #1–#8 each having 32 bits. As a matter of course, this is a matter defined by a system adopting the interleave scheme.

Furthermore, while description has been made assuming that the interim address decision is conducted at timing corresponding to just half of the number of bits of each word, it is a matter of course that the interim address decision is not limited to this. In short, any number of bits may be used so long as the presence of a candidate of its own address can be presumed.

Furthermore, while description has been made assuming that the bit counting of the block is conducted for the interleaved received data, it may be conducted for the deinterleaved data.

In addition, rapidness is required in the interim decision and the full address decision. In the present embodiment, the received data and its address information are taken out in a bit serial form by using a high speed clock. If the received data and its address information are supplied to the comparator in a parallel form, the decision can be conducted more rapidly.

As described above, the present invention makes it possible to presume the presence and absence of a candidate of its own address on the basis of received data before all data of one block are received. In the case where its own address is not contained, therefore, the receiving operation can be stopped earlier before the end of a block. Wasteful power consumption of a battery power source can thus be suppressed.

What is claimed is:

1. An apparatus for receiving an interleaved selective calling signal including a block of interleaved address data of a plurality of addresses each having a predetermined bit length, comprising:

an address storage storing a predetermined address which has been assigned to the apparatus;

a radio system for receiving the interleaved selective calling signal to produce interleaved reception data;

a converter for converting the interleaved address data to address data for each of the addresses;

a timing detector for detecting predetermined decision timing based on the interleaved address data, wherein the predetermined decision timing is set at a desired position within the block of the interleaved address data;

an interim comparator for comparing partial address data for each of the addresses with a counterpart of the predetermined address stored in the address storage at the predetermined decision timing to produce a decision result for each of the addresses;

a controller controlling such that the radio system is selectively powered on and off at the predetermined decision timing based on decision results for the addresses; and a full comparator for comparing full address data for each of the addresses with the predetermined address stored in the address storage at a timing corresponding to an end of the block to produce a full decision result for each of the addresses;

wherein said received data and said address information are supplied to said interim comparator and said full comparator in a parallel form, thereby to reduce a power supply decision time.

2. The apparatus according to claim 1, wherein the timing detector comprises a bit counter for counting bits of the interleaved address data to provide the predetermined decision timing when the bit counter reaches a predetermined value corresponding to the desired position within the block.

3. The apparatus, as claimed in claim 2, wherein the timing detector comprises a bit counter for counting bits of deinterleaved data to provide the predetermined decision timing.

4. The apparatus according to claim 1, wherein the interim comparator comprises:
    a first bit comparator for comparing the partial address data for each of the addresses bit by bit with the counterpart of the predetermined address to produce error bit data for each of the addresses; and
    a first error comparator for comparing the number of error bits of the error bit data with a predetermined value to produce the decision result for each of the addresses.

5. The apparatus according to claim 4, wherein the controller controls such that the radio system is powered off when all the decision results for the addresses indicate that the number of error bits of the error bit data is not smaller that the predetermined value.

6. The apparatus according to claim 4, wherein the controller controls such that the radio system continues to be supplied with power when at least one decision result indicates that the number of error bits of the error bit data is smaller that the predetermined value.

7. The apparatus according to claim 1, when a full decision result indicates that the predetermined address is included in the addresses, the controller controls such that the radio system is supplied with power to receive a block followed by the block of the interleaved address data.

8. The apparatus according to claim 7, wherein the full comparator comprises:
    a second bit comparator for comparing the full address data for each of the addresses bit by bit with the predetermined address to produce error bit data for each of the addresses; and
    a second error comparator for comparing the number of error bits of the error bit data with a predetermined value to produce the full decision result for each of the addresses.

9. A method for receiving an interleaved selective calling signal in a radio selective call receiver, the interleaved selective calling signal including a block of interleaved address data of a plurality of addresses each having a predetermined bit length,
    the radio selective call receiver comprising:
    a memory storing a predetermined address which has been assigned to the radio selective call receiver; and
    a radio system for receiving the interleaved selective calling signal to produce interleaved reception data, the method comprising:
        a) converting the interleaved address data to address data for each of the addresses;
        b) detecting a predetermined decision timing based on the interleaved address data, wherein the predetermined decision timing is set at a desired position within the block of the interleaved address data;
        c) comparing partial address data for each of the addresses with a counter part of the predetermined address stored in the address storage at the predetermined decision timing to produce a decision result for each of the addresses;
        d) selectively powering on and off the radio system at the predetermined decision timing based on decision results for the addresses; and
        e) comparing full address data for each of the addresses with the predetermined address stored in the address storage at timing corresponding to an end of the block to reduce a full decision result for each of the addresses, when d), the radio system has been powered on,
    wherein said received data and said address information are supplied to said interim comparator and said full comparator in a parallel form, thereby to reduce a power supply decision time.

10. The method according to claim 9, wherein b) comprises:
    counting bits of the interleaved address data to provide the predetermined decision timing when the bit counter reaches a predetermined value corresponding to the desired position within the block.

11. The method according to claim 9, wherein c) comprises:
    comparing the partial address data for each of the addresses bit by bit with the counterpart of the predetermined address to produce error bit data for each of the addresses; and
    comparing the number of error bits of the error bit data with a predetermined value to produce the decision result for each of the addresses.

12. The method according to claim 11, wherein d) comprises:
    powering off the radio system when all the decision results for the addresses indicated that the number of error bits of the error bit data is not smaller that the predetermined value.

13. The method according to claim 11, wherein d) comprises:
    continuously supplying the radio system with power when at least one decision result indicates that the number of error bits of the error bit data is smaller that the predetermined value.

14. The method according to claim 9, wherein, when a full decision result indicates the predetermined address is included in the addresses, the radio system is supplied with power to receive a block followed by the block of the interleaved address data.

15. The method according to claim 14, wherein e) comprises:
    comparing the full address data for each of the addresses bit by bit with the predetermined address to produce error bit data for each of the addresses; and
    comparing the number of error bits of the error bit data with a predetermined value to produce the full decision result for each of the addresses.

16. An apparatus for receiving an interleaved selective calling signal including a block of interleaved address data of a plurality of addresses each having a predetermined bit length, comprising:
    means for storing a predetermined address which has been assigned to the apparatus;
    means for comparing address data for each of the addresses with a counterpart of the predetermined address stored in the address storage at a predetermined decision timing, said comparing means producing a decision result for each of the addresses; and
    means for controlling such that the radio system is selectively powered on and off at the predetermined decision timing based on decision results for the addresses,
    wherein said means for comparing comprises an interim comparator and a full comparator, and
    wherein said received data and said address information are supplied to said interim comparator and said full comparator in a parallel form, thereby to reduce a power supply decision time.

17. The apparatus, as claimed in claim 16, wherein said comparing means comprises:

an interim comparator for comparing partial address data for each of the addresses with a counterpart of the predetermined address stored in the address storage at a predetermined decision timing; and a full comparator for comparing full address data for each of the addresses with the predetermined address stored in the address storage at a timing corresponding to an end of the block to produce a full decision result for each of the addresses.

18. The apparatus, as claimed in claim 17, wherein said full comparator compares all received bits of one block with the bits of the predetermined address stored in the address storage.

19. The apparatus, as claimed in claim 16, further comprising:

means for receiving the interleaved selective calling signal to produce interleaved reception data;

means for converting the interleaved address data to address data for each of the addresses; and means for detecting predetermined decision timing based on the interleaved address data, wherein the predetermined decision timing is set at a desired position within the block of the interleaved address data.

* * * * *